Figure 1:
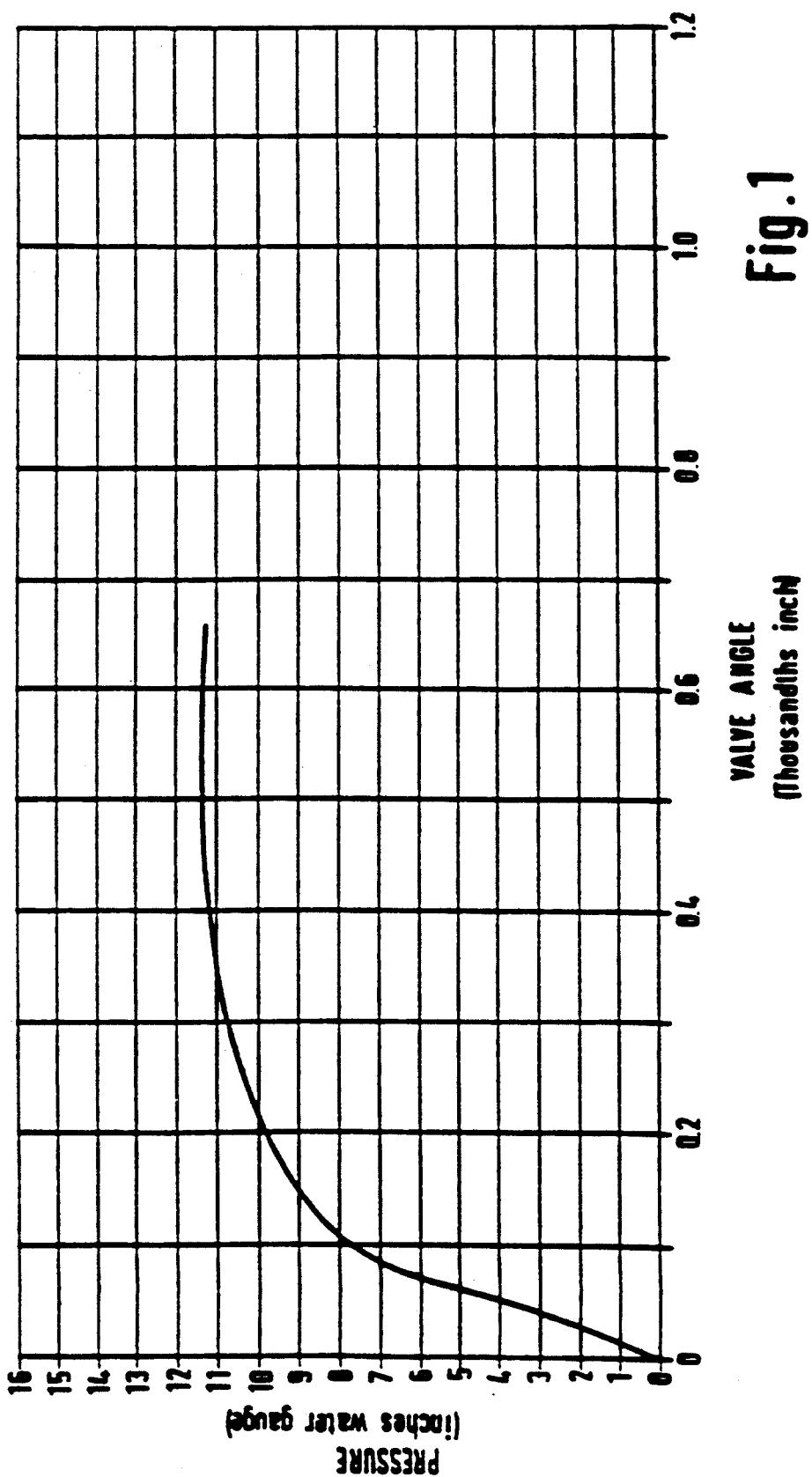

# United States Patent [19]

Gore

[11] Patent Number: 5,272,778
[45] Date of Patent: Dec. 28, 1993

[54] VALVE USEFUL IN LOW AIR LOSS BEDS
[75] Inventor: Peter G. Gore, Sheffield, England
[73] Assignee: The Mediscus Group Inc., Akron, Ohio
[21] Appl. No.: 689,873
[22] PCT Filed: Jan. 25, 1990
[86] PCT No.: PCT/GB90/00100
  § 371 Date: Aug. 26, 1991
  § 102(e) Date: Aug. 26, 1991
[87] PCT Pub. No.: WO90/08491
  PCT Pub. Date: Aug. 9, 1990
[30] Foreign Application Priority Data
  Jan. 25, 1989 [GB] United Kingdom ............... 8901594
[51] Int. Cl.$^5$ ..................... A47C 27/10; A61G 7/057
[52] U.S. Cl. .............................. 5/453; 5/914; 137/614.11
[58] Field of Search ............... 5/453, 455, 469, 423, 5/449, 456, 914; 137/614.11, 614.2

[56] References Cited
U.S. PATENT DOCUMENTS

| | | |
|---|---|---|
| 3,388,701 | 6/1968 | Schreiber et al. |
| 3,646,969 | 3/1972 | Stampfli ............ 137/627.5 |
| 3,909,858 | 10/1975 | Ducker . |
| 4,099,276 | 7/1978 | Hunt et al. . |
| 4,935,968 | 6/1990 | Hunt et al. ............ 5/453 |
| 4,962,552 | 10/1990 | Hasty ............ 5/453 |

FOREIGN PATENT DOCUMENTS

| | | |
|---|---|---|
| 2017776 | 8/1979 | Fed. Rep. of Germany . |
| 7018341 | 12/1971 | France . |
| 8606624 | 7/1986 | PCT Int'l Appl. . |
| 1442994 | 7/1976 | United Kingdom . |
| 1474018 | 5/1977 | United Kingdom . |
| 2070426 | 9/1981 | United Kingdom . |
| 1601808 | 11/1981 | United Kingdom . |

Primary Examiner—Alexander Grosz
Attorney, Agent, or Firm—Amster, Rothstein & Ebenstein

[57] ABSTRACT

A low air loss bed has a microprocessor for simultaneously controlling the supply and exhaust valves of individual bed sections. Air is supplied from a blower to a valve assembly which comprises an inlet valve and an exhaust valve. The inlet valve is linked to the exhaust valve so that opening of the inlet valve is automatically accompanied by a corresponding degree of closure of the exhaust valve, and vice-versa.

7 Claims, 5 Drawing Sheets

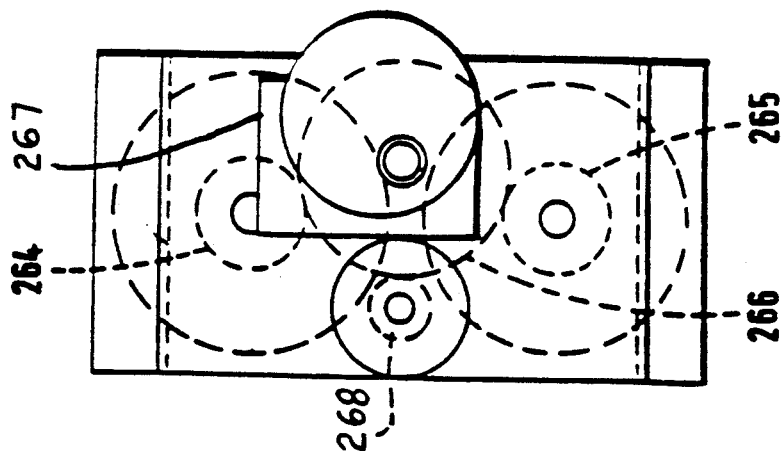
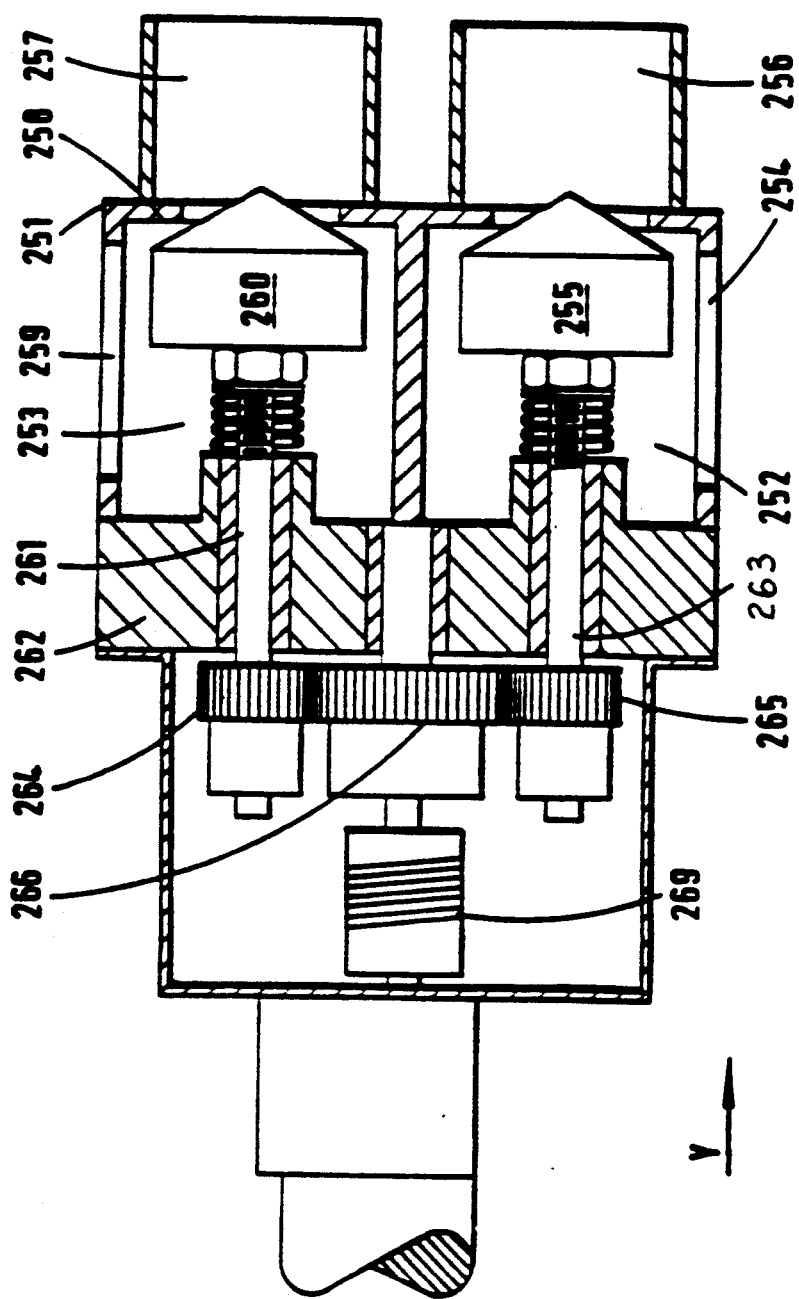
Fig. 6
Fig. 5

VALVE USEFUL IN LOW AIR LOSS BEDS

This invention relates to low air loss beds and in particular to means for controlling the air flow and pressure in the air sacs of such beds.

In a low air loss bed the user is supported on a series of inflated air sacs which are divided, for control purposes, into several groups. Each group is individually supplied with pressurised air so that each part of the body, viz:- the head, trunk, sacrum, thighs and feet can be supported at the most favourable contact pressure. Various features of commercial low air loss beds will be apparent from U.K. Patents Nos: 1,422,994; 1,474,018; 1,601,808 and 2,070,426 and U.S. Pat. Nos. 3,909,858 and 4,099,276.

One longstanding difficulty in operating low air loss beds (hereinafter referred to as L.A.L. beds), has been to adjust the pressures in individual groups of sacs rapidly to a desired pressure or series of pressures. Normally, L.A.L. beds have been fitted with air supply control valves for each section and sometimes also control valves on the exhaust side. Achievement of a desired pressure in a particular section has required a series of adjustments to the supply valves, because of the interaction of one set of sacs with the next. Also, the rate of flow of air through the sacs necessitates adjustment of exhaust valve setting in order to maintain a desired flow rate. Uniform flow rate is desirable since otherwise the bed will heat unevenly; heating normally being effected by passing air from the blower over heating elements and then feeding the heated air to the valve system. Although a compensator valve arranged at the exhaust side of the bed, as described in U.K. No: 1,601,808, does help to maintain desired air flow rates, some skill is still required by nursing staff to operate a L.A.L. bed in an optimum manner. Furthermore, current valve systems are not ideally suited to electronic process control since, as a result of the valve characteristics, it takes a long time for the system to settle to a new pressure.

According to the present invention there is provided a low air loss bed comprising a plurality of inflatable air sacs which are grouped in sections, the pressure of air in at least one section being controlled by a valve arrangement comprising an inlet valve and an exhaust valve, the inlet valve being linked to the exhaust valve so that opening of the inlet valve is automatically accompanied by a corresponding degree of closure of the exhaust valve and vice versa.

The linkage between the inlet and exhaust valves may be mechanical. However, as an alterative, the valves may be linked electrically or by a fluid connection or other means. For example, an electrical, magnetic or hydraulic clutch. Where a mechanical linkage is employed this may be achieved by mounting the valve heads on the same spindle. An alternative and currently preferred arrangement is to support the valves side-by-side in a housing and to link their spindles by gearing to a common drive shaft.

A most surprising finding of the valve arrangement according to this invention is that there is a virtually linear relationship between pressure in the bed section and valve angle or degree of opening. This makes the valve characteristics very predictable and facilitates the adaption of electronic microprocessor control in a bed fitted with valve assemblies in accordance with the invention. Microprocessor control may be achieved by driving the valves by a stepping motor through a common shaft, the motor being controlled by a computer. Since pressures established in the air sacs and air flows in the sacs will be determined by the valve openings and pressure of the air source applied to the valve assembly, individual pressure gauges can be eliminated. Once the system has been calibrated, the computer will be able to predict the pressures in the sacs from known valve angles.

Figure 2:
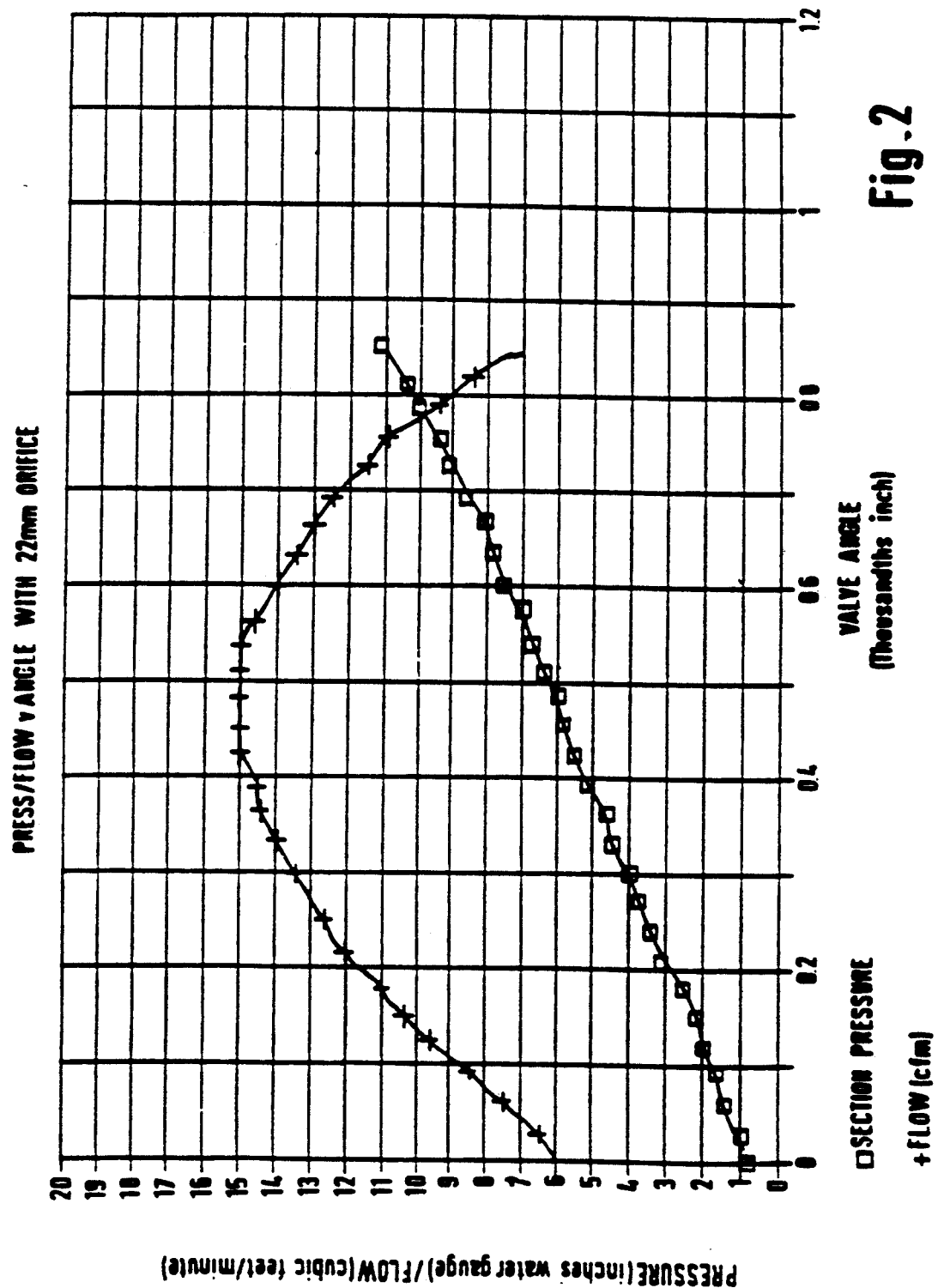
Figure 3:
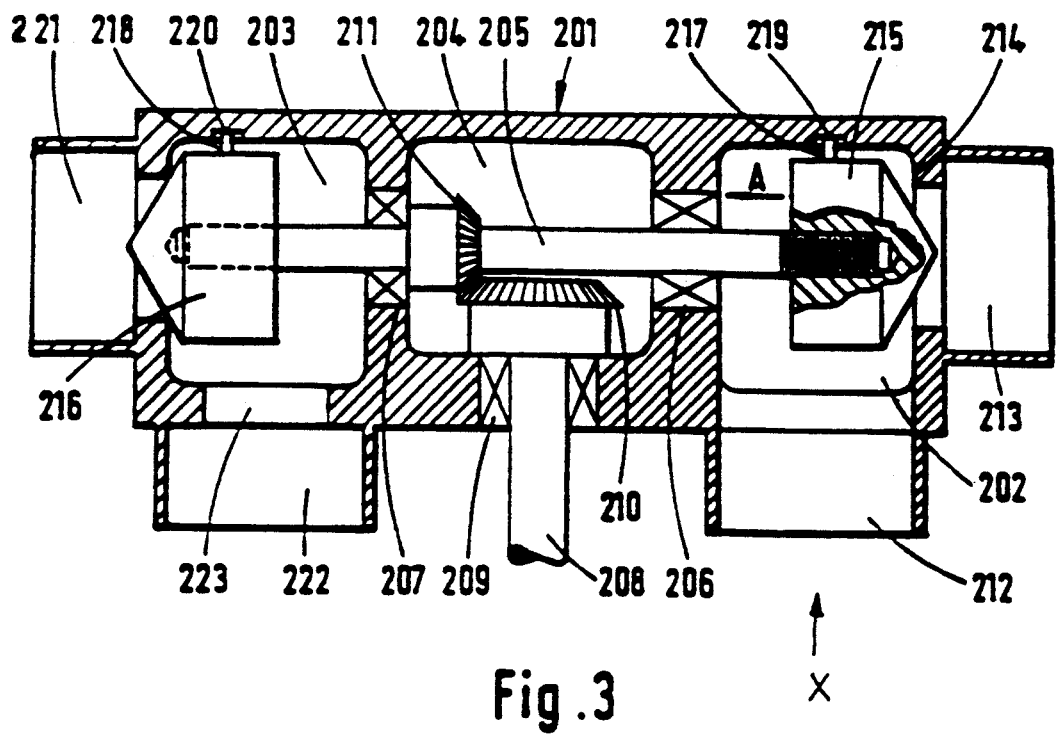
Figure 4:
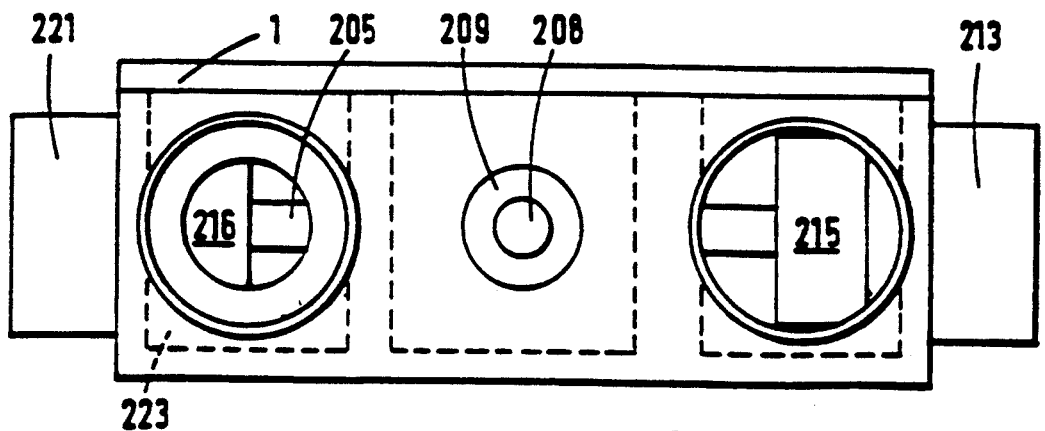
Figure 7:
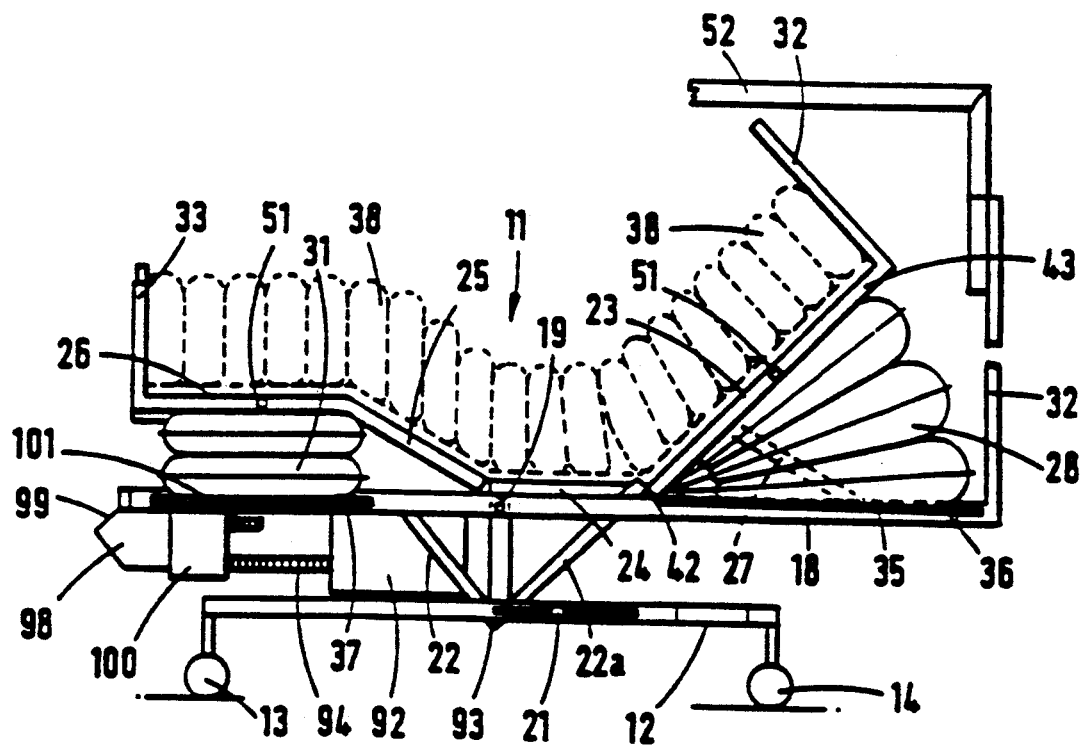
Figure 8:
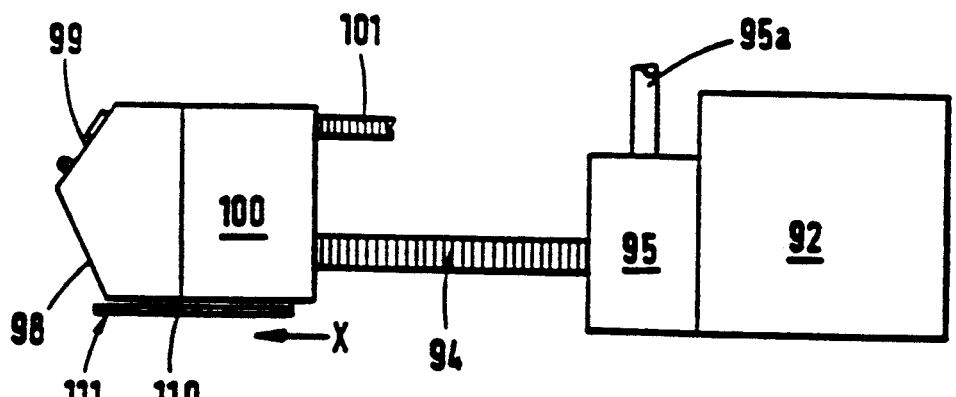

Further features and advantages of the valve assembly according to the invention will become apparent from the following description and accompanying drawings in which:

FIG. 1 is a graph showing the operating characteristics of a conventional inlet valve fitted to an LAL bed, FIG. 2 is a graph showing the operating characteristics of a valve assembly in accordance with the invention when fitted to an LAL bed, FIG. 3 is a section through a first embodiment of a valve assembly according to the invention, FIG. 4 is a view looking in the direction of the arrow X in FIG. 3, FIG. 5 is a section through a second embodiment of the valve assembly according to the invention, FIG. 6 is a view looking in the direction of arrow Y in FIG. 5, FIG. 7 is a diagrammatic side elevation of a low air loss bed, and FIG. 8 is a schematic view of the blower and control box assembly of the bed shown in FIG. 7.

Referring to FIGS. 3 and 4 of the drawings, the valve comprises a housing 201 which is divided into an inlet compartment 202, an outlet compartment 203 and a central compartment 204. Mounted in the housing block 201 is a valve spindle 205 which is supported for rotation in bearings 206 and 207, located in the walls dividing the central compartment from compartments 202 and 203. Valve spindle 205 can be rotated by a drive shaft 208 which is mounted for rotation in a bearing 209 and carries a pinion gear 210 which meshes with a corresponding gear 211 fixed on spindle 205. Drive shaft 208 can be turned manually or by a geared down electric motor or by an arrangement which enables the shaft to be driven by a motor with manual override.

Inlet valve chamber 202 has an air inlet port 212 and an outlet port 213 which is intended to be connected to a header feeding air to a group of air sacs (not shown) which forms one section of the L.A.L. bed, e.g. the head section. Inlet valve chamber 202 is connected to a source of pressurised air which may be an air blower mounted on the bed (or in a separate console). The air blower may feed air to the inlet chamber via a reservoir and/or a thermostatically controlled heater. Outlet port 213 incorporates a valve seat 214 and an inlet valve head 215 is mounted on one end of spindle 205 for engagement with the valve seat 214. The ends of the spindle are formed with threads which engage with complementary threads formed in axial bores in the valve heads 215 and 216. In order to prevent the valve heads from rotating when the valve spindle is rotated, the valve heads incorporate a projection 217 or 218 which is slidably received in a groove 219 or 220 in the housing block 201. Thus, the arrangement is such that when the spindle 205 is turned in one direction, the valve head 215 moves in the direction of the arrow A away from its seat, while the valve head 216 moves in the same direction towards its seat.

Valve compartment 203 has a port 221 which is connected to the exhaust side of the same group of sacs supplied with air from port 213. Compartment 203 also has an outlet port 222 for venting exhaust air to atmosphere via a secondary orifice 223.

FIG. 3 shows the valve assembly with the inlet valve head 215 in its fully open position and the valve head 216 in its fully closed position. Normally, such a valve setting would not be used in practice, unless there was significant leakage through the sacs, since some through flow of air could be required and the setting shown would inflate the sacs to maximum pressure supplied by the blower. In the case of an L.A.L. bed, in which all the sections are valve assemblies similar to that shown in FIGS. 3 and 4, a separate on/off valve may be fitted in or connected to port 222, which can be closed for instant inflation of the sacs to maximum pressure. A by-pass line from the blower to the header and equipped with an on/off valve may also be provided to increase the rate of inflation. The valve assembly shown in this Figure can then be left in a setting which corresponds approximately to its normal setting.

FIG. 2 is a graph showing the operating characteristics of the valve assembly of FIGS. 3 and 4. The lower trace represents the pressure in the section at different valve openings of the inlet valve. As can be seen, the relationship between the section pressure and the valve opening is virtually linear. Also, plotted on the same graph is the flow rate of air through the section at various valve openings (upper trace). Generally speaking, the operating pressures in a L.A.L. bed are in the range of about 4 to about 8 inches water gauge. At these pressures, it can be seen from the graphs that the air flows are grouped in a fairly narrow range of about 13 to 15 cubic feet per minute. The air flow curve will be flattened even further by introducing a higher degree of throttling at the secondary orifice 223. When using valves in accordance with the invention for controlling pressure and air flow in a low air loss bed, the air sacs should be essentially air-tight, i.e. any seams should be sealed or welded. This removes an important variable and ensures that the characteristics described above are achieved. Also, sealing of the sacs avoids air being blown directly onto the patient.

FIG. 1 shows, in comparison, the characteristics of an inlet valve and a compensator valve on the exhaust side, such as described in U.K. Patent No. 1,601,808. As can be seen, the curve is very steep and non-linear, which makes it very difficult to control by an electronic process control. Although not shown directly, the corresponding air flow curve is sharper, showing that the rate of air flow is more sensitive to changes in inlet pressure.

A second and currently preferred embodiment is shown in FIGS. 5 and 6. The operating characteristics of the valve assembly are similar to that shown in FIGS. 3 and 4. However, the choice of separate valve spindles makes it easier to manufacture valve seats which are precisely at right angles to the valve spindles. Referring to these Figures, the valve assembly comprises a housing 251 which is divided into upper and lower chambers 252 and 253. In this embodiment, the chamber 252 is designated the inlet chamber and 253 the exhaust chamber. Normally, air is supplied by a blower (not shown), via an inlet port 254, past inlet valve head 255 into outlet port 256 and then to the bed section which feeds the sacs in that section. Air is exhausted from the sacs into a header chamber and thence through port 257 and valve seat 258, and out to atmosphere via orifice 259. Exhaust valve head 260 is mounted on valve spindle 261 which is received in a bore formed in a block 262 forming one side of the housing 251.

Similarly, inlet valve head 255 is mounted on a parallel spindle 263 which is also received in a bore in the housing 251. Spindles 261 and 263 are formed with opposite threads so that on rotation of the spindles in the same direction, the valve heads move in opposite directions. At the end of each of the spindles 261 and 263, remote from the valve heads, are fitted drive gears 264 and 265. Gears 264 and 265 are splined on their respective spindles and mesh with an intermediate gear 266 which is driven from an electric motor 267 via a gear 268.

The valve is adjusted initially by removing one of the gears 264 or 265, rotating the valve by the number of turns required and then reinserting the gear to lock the two valves together in the required relative disposition.

Referring now particularly to FIGS. 7 and 8, these figures show a bed whose construction is generally as described in our prior U.S. Pat. No. 1,474,018, (except that it has an on-board pump or blower unit 92) and like reference numerals used in FIG. 7 refer to the same parts as indicated by the same reference numerals in our above prior patent. The superstructure of the bed is supported on an attitude frame 18 which is mounted on a trolley frame 12. Conveniently, the trolley frame 12 includes a pair of struts 16 on which the attitude frame 18 is pivotably connected at axis 19. Struts 22 and 22a are connected to the attitude frame 18 at their upper ends and to each other at their lower ends by a transverse bar 93. A motorised actuator, shown diagrammatically at 21, acts between the transverse bar 93 and the trolley frame 12 to pivot the attitude frame 18 around the axis 19.

Mounted beneath the attitude frame 18 is a pump unit 92 whose construction may be generally as described above. A centrifugal blower is preferred. Blower unit 92 is mounted beneath attitude frame 18 via anti-vibration rubber dampers (not shown). The air output from blower unit 92 is conducted via a conduit 94 to a box 100 which is mounted beneath the attitude frame 18 and which constitutes a distribution chamber. The box 100 contains a heating element. Connected to the box 100 or integrally formed therewith is a housing 98 which contains heater controls, a thermostat and pressure gauges and devices for detecting any excess temperature developed within the bed. The housing 98 includes a front panel 99 on which temperature indicators, pressure indicator dials, switches and other controls are mounted.

Referring to FIG. 8, this shows a schematic view of the air supply arrangement for the bed. Air produced by the air blower housed in blower cabinet 92 passes into a housing 95 and then via conduit 94 into heater box 100. Housing 95 also has an outlet conduit 95a for supplying air at blower pressure via electrically controlled valves (not shown) to head and foot bellows 28 and 31 respectively.

Air supplied via conduit box 94 to box 100 is heated to a thermostatically controlled temperature and passes via conduit 101 to the seat section 24 of the bed. Seat section 24 incorporates a distribution manifold (not shown) from which heated air at blower pressure distributed via flexible hoses to each of the bed sections, 23, 24, 25 and 26 (section 23 is normally divided into a head and trunk section). Each bed section incorporates a valve assembly such as shown in FIGS. 3 and 4, or 5 and 6, the appropriate flexible feed conduit being connected to the respective inlet port of the valve assembly. Alternatively, the valve arrangements for all the bed sections may be incorporated in a single unit, preferably mounted in the seat section 24 since this is fixed to the attitude frame. Air at the appropriate pressure for each bed section is therefore fed (and exhausted from) the headers in each bed section via a centralised valve unit in the seat section.

Preferably, the valve system described above is controlled by a microprocessor, which may also control other functions of the bed, such as valves required for instant inflate and the temperature control and other functions. The microprocessor should include feedback functions and may be linked to the bed as described, for example, in WO 86/06624.

Other details of the construction of the air bed can be found in U.K. Patents Nos. 1,442,994; 1,474,018; 1,601,808 and 2,070,426, and U.S. Pat. Nos. 3,909,858 and 4,099,276, and WO 86/06624, all of which are specifically incorporated herein by reference.

I claim:

1. A low air loss bed comprising a plurality of inflatable air sacs which are grouped in sections, the pressure of air in at least one section being controlled by a valve arrangement comprising an inlet valve and an exhaust valve, the inlet valve being linked to the exhaust valve so that opening of the inlet valve is automatically accompanied by a corresponding degree of closure of the exhaust valve and vice versa.

2. A bed according to claim 1 in which the inlet and exhaust valves in said valve arrangement are mechanically linked.

3. A bed according to claim 2 in which the inlet and exhaust valves are linked by gearing to a common drive shaft.

4. A bed according to claim 3 in which the inlet and exhaust valves are mounted side-by-side in a common housing and have respective spindles which are linked to a motor drive shaft so that as one spindle rotates in one direction the other spindle rotates in the opposite direction.

5. A low air loss bed comprising a plurality of inflatable air sacs which are grouped in sections, the pressure of air in at least one section and the flow of air through the sacs in the section being controlled by a valve assembly comprising an inlet valve and an exhaust valve, the inlet valve being linked to the exhaust valve so that the opening of the inlet valve is automatically accompanied by a corresponding degree of closure of the exhaust valve and vice versa, and means for supplying pressurised air to said valve assembly so as to cause air to flow into the sacs and out of the sacs through the exhaust valve.

6. A bed according to any one of the preceding claims in which the sacs are substantially sealed.

7. A bed according to any one of the preceding claims in which each of said valve arrangements is controlled by a microprocessor.

* * * * *